United States Patent
Yasui et al.

(10) Patent No.: US 8,553,317 B2
(45) Date of Patent: Oct. 8, 2013

(54) ELECTROPHORESIS DEVICE, METHOD OF MANUFACTURING THE ELECTROPHORESIS DEVICE, DISPLAY, DISPLAY SUBSTRATE, AND ELECTRONIC UNIT

(75) Inventors: Atsuhito Yasui, Kanagawa (JP); Hiroyuki Yasukochi, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 13/586,996

(22) Filed: Aug. 16, 2012

(65) Prior Publication Data

US 2013/0050806 A1 Feb. 28, 2013

(30) Foreign Application Priority Data

Aug. 26, 2011 (JP) ................. 2011-184946

(51) Int. Cl.
*G02B 26/00* (2006.01)
*G09G 3/34* (2006.01)
*G03G 17/04* (2006.01)

(52) U.S. Cl.
USPC ............................ 359/296; 345/107; 430/32

(58) Field of Classification Search
USPC ......... 359/296, 245, 253–254, 290–291, 298; 349/33; 345/49, 105, 107; 430/31–32
See application file for complete search history.

(56) References Cited

U.S. PATENT DOCUMENTS

| | | | |
|---|---|---|---|
| 3,892,568 A | 7/1975 | Ota | |
| 2001/0041339 A1* | 11/2001 | Anderson et al. | 435/6 |
| 2002/0050976 A1* | 5/2002 | Yamaguchi et al. | 345/105 |
| 2007/0196401 A1* | 8/2007 | Naruse et al. | 424/401 |
| 2008/0112040 A1* | 5/2008 | Suwabe et al. | 359/296 |

FOREIGN PATENT DOCUMENTS

| | | |
|---|---|---|
| JP | 50-015115 | 6/1975 |
| JP | 50-015120 | 6/1975 |
| JP | 2551783 B2 | 8/1996 |
| JP | 2002-244163 A | 8/2002 |
| JP | 2003-526817 A | 9/2003 |
| JP | 2005-107146 A | 4/2005 |
| JP | 2005-128143 A | 5/2005 |
| JP | 4188091 B2 | 9/2008 |

* cited by examiner

*Primary Examiner* — Dawayne A Pinkney
(74) *Attorney, Agent, or Firm* — Wolf, Greenfield & Sacks, P.C.

(57) ABSTRACT

An electrophoresis device, includes: a migrating particle; a porous layer including a fibrous structure holding a non-migrating particle having optical reflection characteristics different from optical reflection characteristics of the migrating particle; and a light-transmissive dividing wall including part of the porous layer.

11 Claims, 10 Drawing Sheets

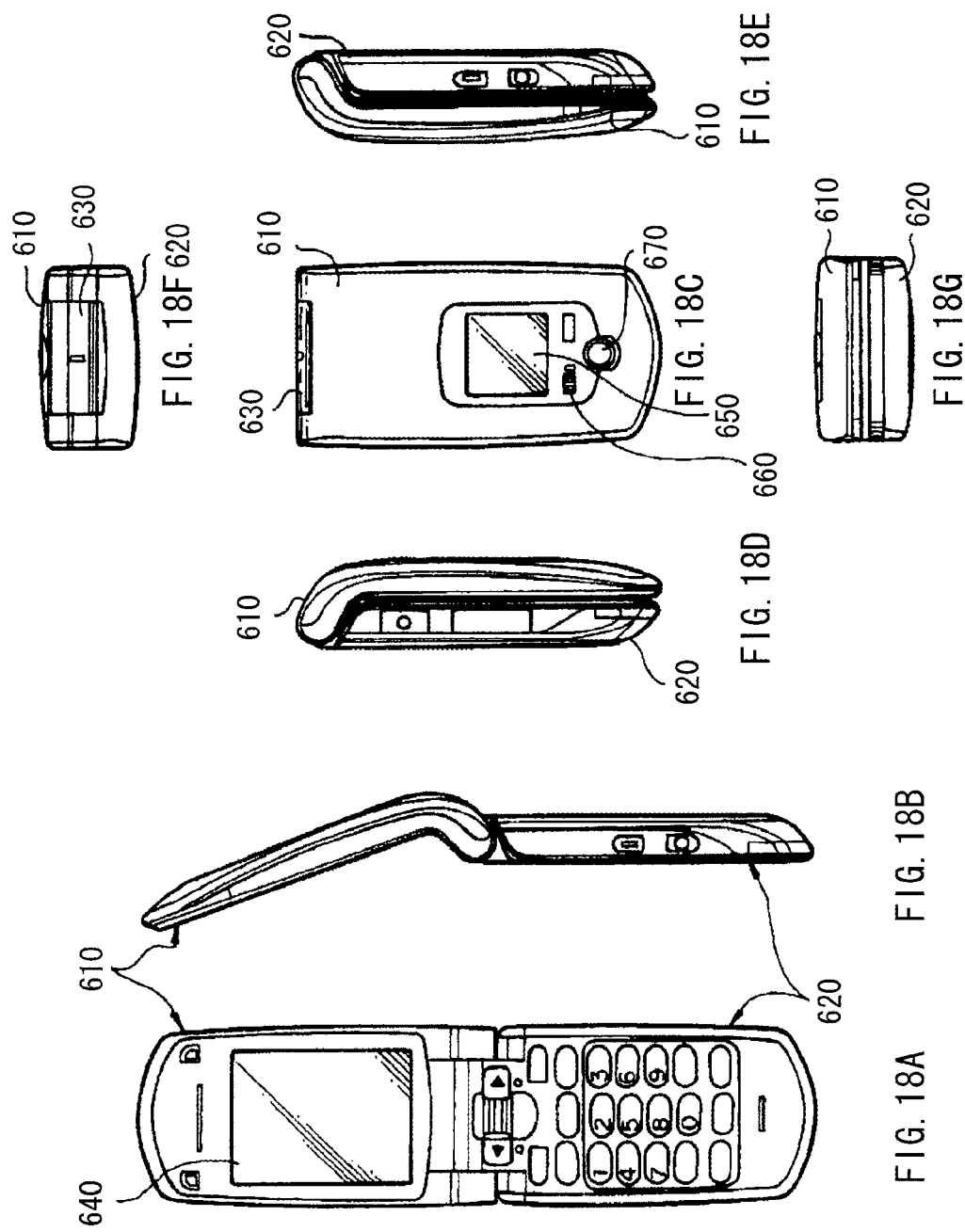

ELECTROPHORESIS DEVICE, METHOD OF MANUFACTURING THE ELECTROPHORESIS DEVICE, DISPLAY, DISPLAY SUBSTRATE, AND ELECTRONIC UNIT

BACKGROUND

The present technology relates to an electrophoresis device including migrating particles and a porous layer, a method of manufacturing the electrophoresis device, a display including the electrophoresis device, a display substrate including the electrophoresis device, and an electronic unit including the display and the display substrate.

Recently, a display, which exhibits high image quality at low power consumption, has been increasingly demanded with spread of a variety of electronic units such as a mobile phone and a personal digital assistant (PDA). In particular, attention is currently focused on an electronic book terminal to read character information for a long time, along with start of electronic book distribution service. It is therefore desirable to provide a display having a display grade suitable for such an application.

A cholesteric liquid crystal type, an electrophoresis type, an electrochromic type, a twist-ball type, and the like have been proposed as a display method of the display for reading. In particular, a reflection type is preferable since the reflection type uses reflection (scattering) of outside light for bright display as in paper, resulting in a display grade similar to a display grade of paper. In addition, the reflection type needs no backlight, leading to a reduction in power consumption.

An electrophoresis-type display, which uses an electrophoretic phenomenon to produce light-and-darkness (contrast), is a potential candidate of the reflection-type display since the electrophoresis-type display exhibits high-speed response at low power consumption. Thus, various investigations have been made on a display principle of the electrophoresis-type display.

In detail, a technique has been proposed, in which two types of charged particles, having different optical reflection characteristics and different polarities, are dispersed in an insulative liquid, and each type of charged particles are transferred using such a difference in polarity (for example, see Japanese Examined Patent Application Publication No. 50-015115 and Japanese Patent No. 4188091). In this technique, distribution of the two types of charged particles varies depending on electric fields, resulting in production of contrast based on a difference in optical reflection characteristics.

Another technique has been proposed, in which charged particles are dispersed in an insulative liquid, and a porous layer having different optical reflection characteristics from those of the charged particles is used to transfer the charged particles through pores in the porous layer (for example, see Japanese Unexamined Patent Application Publication Nos. 2005-107146, 2005-128143, and 2002-244163 and Japanese Examined Patent Application Publication No. 50-015120). The porous layer may be a polymer film having laser-drilled pores, a woven cloth of a synthetic fiber, an open-cell porous polymer, and/or the like, for example. In this technique, distribution of the charged particles varies depending on electric fields, resulting in production of contrast based on the difference in optical reflection characteristics.

In addition, there have been proposed a technique of enclosing charged particles in microcapsules, and a technique of using a dividing wall structure to partition a space in which charged particles are allowed to exist (for example, see Japanese Patent No. 2551783 and Japanese Unexamined Patent Application Publication (Translation of PCT Application) No. 2003-526817). Aggregation, precipitation, and convection of the charged particles are suppressed through the techniques.

SUMMARY

Although a variety of display principles have been proposed for the electrophoresis-type display, the display grade of the electrophoresis-type display is still not satisfactorily high. The electrophoresis-type display is likely to be developed into colorization and movie display in the future. It is therefore desirable to achieve further improvement in performance of the electrophoresis-type display in view of contrast and response speed. Here, it is important to suppress power consumption in order to make the most of the original advantage of the electrophoresis-type display.

It is desirable to provide an electrophoresis device that achieves high contrast, high-speed response, and low power consumption, a method of manufacturing the electrophoresis device, and a display, a display substrate, and an electronic unit, each including the electrophoresis device.

An electrophoresis device according to an embodiment of the present technology includes: a migrating particle; a porous layer including a fibrous structure holding a non-migrating particle having optical reflection characteristics different from optical reflection characteristics of the migrating particle; and a light-transmissive dividing wall including part of the porous layer.

A display according to an embodiment of the present technology includes: an electrophoresis device between a pair of substrates, one or both of the substrates being light-transmissive. The electrophoresis device includes a migrating particle, a porous layer including a fibrous structure holding a non-migrating particle having optical reflection characteristics different from optical reflection characteristics of the migrating particle, and a light-transmissive dividing wall including part of the porous layer.

A display substrate according to an embodiment of the present technology includes: an electrophoresis device on one surface of a light-transmissive substrate. The electrophoresis device includes a migrating particle, a porous layer including a fibrous structure holding a non-migrating particle having optical reflection characteristics different from optical reflection characteristics of the migrating particle, and a light-transmissive dividing wall including part of the porous layer.

An electronic unit according to an embodiment of the present technology includes: a display including an electrophoresis device between a pair of substrates, one or both of the substrates being light-transmissive. The electrophoresis device includes a migrating particle, a porous layer including a fibrous structure holding a non-migrating particle having optical reflection characteristics different from optical reflection characteristics of the migrating particle, and a light-transmissive dividing wall including part of the porous layer.

A method of manufacturing an electrophoresis device according to an embodiment of the present technology includes: forming a porous layer; applying a photosensitive solution to allow the porous layer to be buried in the photosensitive solution; and exposing and developing the photosensitive solution to form a light-transmissive dividing wall including part of the porous layer. The porous layer includes a fibrous structure holing a non-migrating particle having optical reflection characteristics different from optical reflection characteristics of a migrating particle.

It is to be noted that "optical reflection characteristics" refer to so-called light (outside light) reflectance. The reason why the optical reflection characteristics of the non-migrating particle are different from those of the migrating particle is to produce contrast using such a difference in light reflectance between the migrating particle and the non-migrating particle.

According to the electrophoresis device, the display, the display substrate, and the electronic unit according to the embodiments of the present technology, the porous layer is configured of the fibrous structure that holds the non-migrating particle having the optical reflection characteristics different from those of the migrating particle. The dividing wall is light-transmissive, and includes part of the porous layer. Consequently, the electrophoresis device, the display, the display substrate, and the electronic unit according to the embodiments of the present technology achieve high contrast, high-speed response, and low power consumption.

In addition, according to the method of manufacturing an electrophoresis device according to the embodiment of the present technology, a photosensitive solution is applied such that the porous layer is buried in the photosensitive solution, and then the photosensitive solution is exposed and developed, so that a light-transmissive dividing wall including part of the porous layer is formed. Consequently, the method achieves an electrophoresis device that exhibits high contrast and high-speed response at low power consumption.

It is to be understood that both the foregoing general description and the following detailed description are exemplary, and are intended to provide further explanation of the technology as claimed.

BRIEF DESCRIPTION OF THE DRAWINGS

The accompanying drawings are included to provide a further understanding of the disclosure, and are incorporated in and constitute a part of this specification. The drawings illustrate embodiments and, together with the specification, serve to explain the principles of the technology.

FIGS. 18A to 18G are plan views each illustrating a configuration of a mobile phone including the display.

DETAILED DESCRIPTION OF EMBODIMENT

Hereinafter, embodiments of the present technology will be described in detail with reference to the accompanying drawings. It is to be noted that description is made in the following order.

1. Display Including Electrophoresis Device
1-1. Configuration
1-2. Manufacturing Method
1-3. Function and Effect
1-4. Modifications
2. Display Substrate Including Electrophoresis Device
3. Application Examples (Electronic Units) of the Display and the Display Substrate

[1. Display Including Electrophoresis Device]
[1-1. Configuration]

Figure 1:
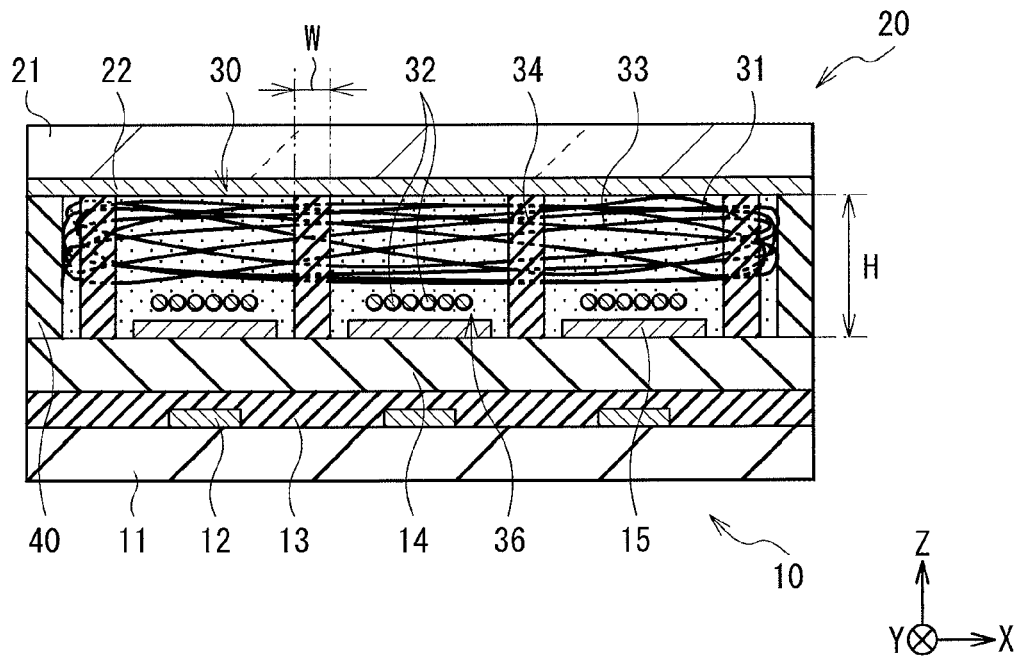
FIG. 1 is a sectional view illustrating a configuration of a display including an electrophoresis device according to an embodiment of the present technology.
Figure 2:
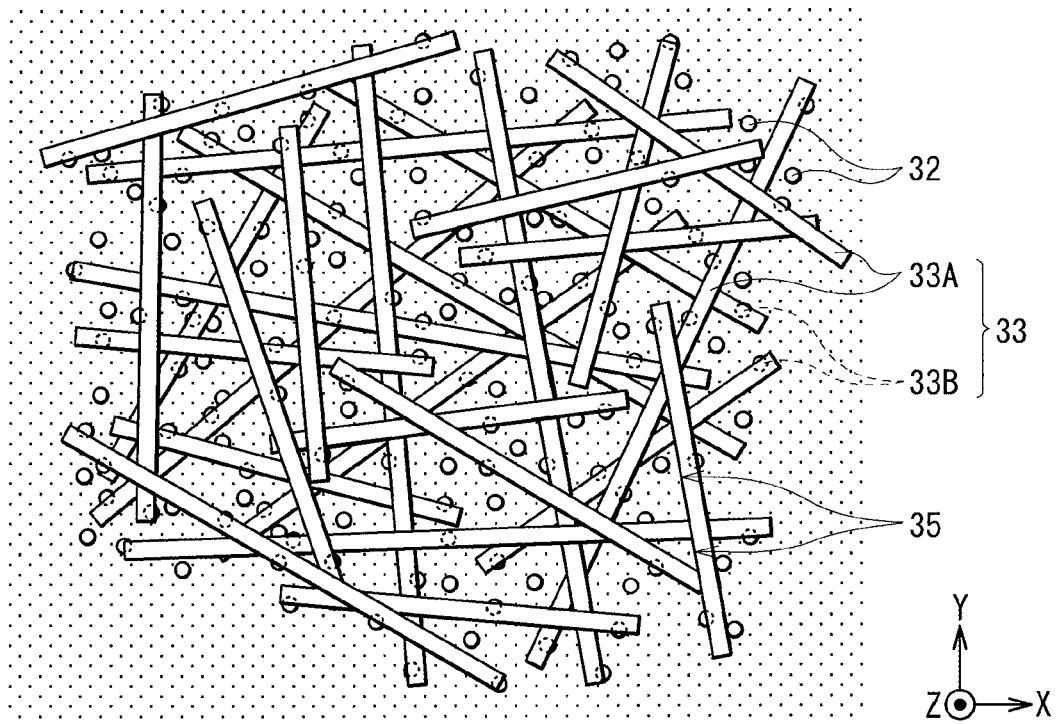
FIG. 2 is a plan view illustrating a configuration of a major part (porous layer) of the display.
Figure 3:
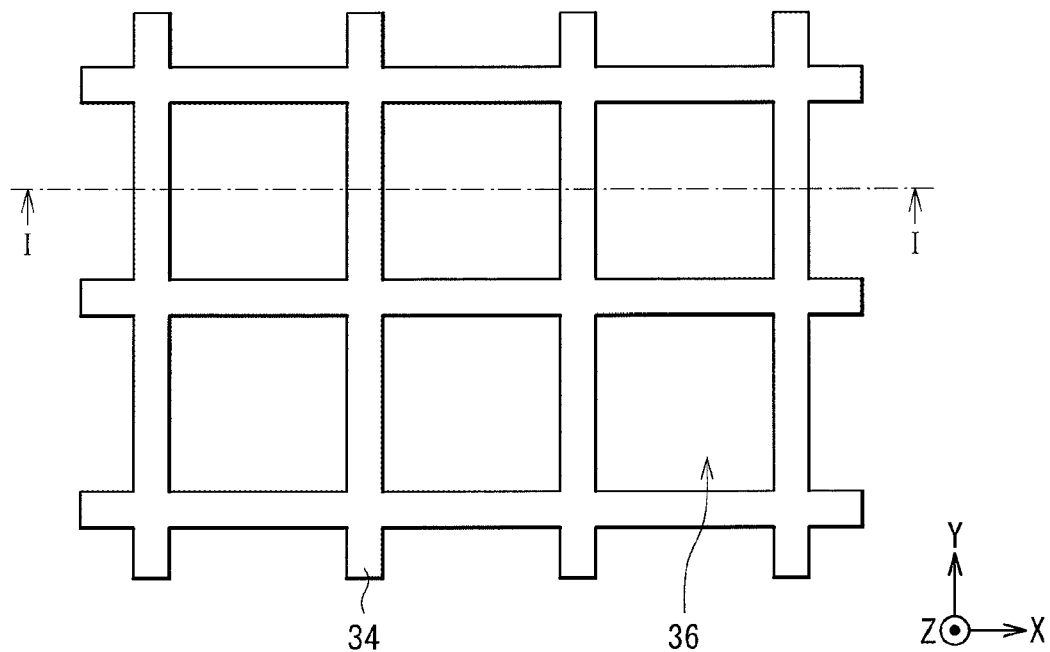
FIG. 3 is a plan view illustrating a configuration of another major part (dividing wall) of the display.

First, the configuration of a display including an electrophoresis device according to an embodiment of the technology is described. FIG. 1 illustrates a sectional configuration of the display, and FIGS. 2 and 3 illustrate planar configurations of major parts (a porous layer and a dividing wall) of the display shown in FIG. 1. It is to be noted that FIG. 1 corresponds to a section along I-I line shown in FIG. 3.

The electrophoresis device is used for various applications such as a display without limitation. Although description is made on a case where the electrophoresis device is applied to a display herein, the configuration of the display is merely shown as an example, and may be appropriately modified.

[Overall Configuration of Display]

The display is an electrophoresis-type display that uses an electrophoretic phenomenon for image display, and is a so-called electronic paper display. For example, as shown in FIG. 1, the display includes a drive substrate 10 and a counter substrate 20, which are disposed to be opposed to each other with an electrophoresis device 30 and a spacer 40 therebetween, and displays an image on a counter substrate 20 side of the display.

[Drive Substrate]

For example, the drive substrate 10 includes a thin film transistor (TFT) 12, a protective layer 13, a planarization insulating layer 14, and a pixel electrode 15, which are stacked in this order on one surface of a support substrate 11. For example, the drive substrate 10 has the TFTs 12 and the pixel electrodes 15 thereon, each of which are separately provided in a matrix in accordance with a pixel arrangement, in order to build an active-matrix drive circuit.

For example, the support substrate 11 includes one, or two or more of materials such as an inorganic material, a metal material, and a plastic material. Examples of the inorganic material include silicon (Si), silicon oxide ($SiO_x$), silicon nitride ($SiN_x$), and aluminum oxide ($AlO_x$). Examples of the silicon oxide include glass and spin-on-glass (SOG). Examples of the metal material include aluminum (Al), nickel (Ni), and stainless steel. Examples of the plastic material include polycarbonate (PC), polyethylene terephthalate (PET), polyethylene naphthalate (PEN), and polyetheretherketon (PEEK).

The support substrate 11 may be light-transmissive or non-light-transmissive, since an image is displayed on the counter substrate 20 side of the display, and therefore the support substrate 11 need not be necessarily light-transmissive. The support substrate 11 can be a rigid substrate such as a wafer, or can be flexible thin-glass or a flexible film. In particular, the latter is preferable since the latter achieves a flexible (foldable) display.

Each TFT 12 is a switching element for pixel selection. The TFT 12 can be an inorganic TFT including an inorganic semiconductor layer including amorphous silicon and/or the like as a channel layer, or can be an organic TFT including an organic semiconductor layer including pentacene and/or the like. Examples of each of the protective layer 13 and the planarization insulating layer 14 include an insulating material such as polyimide. In the case where the surface of the protective layer 13 is sufficiently flat, however, the planarization insulating layer 14 may be omitted. Examples of the pixel electrode 15 include one, or two or more of conductive materials such as gold (Au), silver (Ag), copper (Cu), aluminum (Al), aluminum alloy, and indium oxide-tin oxide (ITO). For example, the pixel electrodes 15 are connected to the TFTs 12 through contact holes (not illustrated) provided in the protective layer 13 and the planarization insulating layer 14.

It is to be noted that FIG. 1 shows an exemplary case where the TFTs 12 are separately provided for individual cells 36 described later (one TFT 12 is disposed for one cell 36). However, this is not limitative, and an arbitrary number of the cells 36 and of the TFTs 12 can be provided at arbitrary positions. For example, two TFTs 12 can be disposed for three cells 36, or a boundary between two adjacent TFTs 12 can be located within a region of one cell 36.

[Counter Substrate]

Examples of the counter substrate 20 include a support substrate 21 having a counter electrode 22 provided entirely on one surface of the support substrate 21. However, the counter electrode 22 may be separately provided in a matrix as in the pixel electrode 15.

The support substrate 21 includes a material similar to that of the support substrate 11 except that the support substrate 21 is light-transmissive. Since an image is displayed on the counter substrate 20 side of the display, the support substrate 21 needs to be light-transmissive. Examples of the counter electrode 22 include one, or two or more of translucent conductive materials (transparent electrode materials) such as indium oxide-tin oxide (ITO), antimony oxide-tin oxide (ATO), fluorine-doped tin oxide (FTO), and aluminum-doped zinc oxide (AZO).

In the case of image display on the counter substrate 20 side, the electrophoresis device 30 is seen from the outside through the counter electrode 22. Hence, light transmission (light transmittance) of the counter electrode 22 is preferably as high as possible, and, for example, 80% or more. In addition, electric resistance of the counter electrode 22 is preferably as low as possible, and, for example, $100\Omega/\square$ or less.

[Electrophoresis Device]

The electrophoresis device 30 uses an electrophoretic phenomenon to produce contrast, and, for example, includes migrating particles 32, a porous layer 33, and a dividing wall 34 in an insulative liquid 31.

[Insulative Liquid]

For example, the insulative liquid 31 is filled in a space enclosed by the drive substrate 10, the counter substrate 20, and the spacer 40.

Examples of the insulative liquid 31 include one, or two or more of nonaqueous solvents such as organic solvents. Examples of the nonaqueous solvents include paraffin and isoparafin. The viscosity and the refractive index of the insulative liquid 31 are each preferably as low as possible. The reason for this is as follows. Such low viscosity leads to improvement in mobility (response speed) of the migrating particles 32, and accordingly leads to a reduction in energy (power consumption) taken for movement of the migrating particles 32. In addition, such a small refractive index leads to an increased difference in a refractive index between the insulative liquid 31 and the porous layer 33, resulting in an increase in light reflectance of the porous layer 33.

It is to be noted that the insulative liquid 31 may contain any appropriate material as necessary. Examples of the material include a colorant, a charge control agent, a dispersion stabilizer, a viscosity adjuster, a surfactant, and a resin.

[Migrating Particles]

The migrating particles 32 are one, or two or more electrically-migrating charged-particles (electrophoretic particles). The migrating particles 32 are dispersed in the insulative liquid 31, and move between the pixel electrodes 15 and the counter electrode 22 depending on electric fields. For example, the migrating particles 32 are particles (powders) including one, or two or more of organic pigment, inorganic pigment, dye, a carbon material, a metal material, metal oxide, glass, a polymer material (resin), and the like. It is to be noted that the migrating particles 32 may be broken particles or capsulated particles of resin solid containing the above-described particles. Materials corresponding to the carbon material, the metal material, metal oxide, glass, and the polymer material are excluded from the materials corresponding to the organic pigment, the inorganic pigment, and dye.

Examples of the organic pigment include azo-based pigment, metal complex azo-based pigment, polycondensed azo-based pigment, flavanthrone-based pigment, benzimidazolone-based pigment, phthalocyanine-based pigment, quinacridone-based pigment, anthraquinone-based pigment, perylene-based pigment, perinone-based pigment, anthrapyridine-based pigment, pyranthrone-based pigment, dioxazine-based pigment, thioindigo-based pigment, isoindolinone-based pigment, quinophthalone-based pigment, and indanthrene-based pigment. Examples of the inorganic pigment include zinc white, antimony white, carbon black, black iron oxide, titanium boride, red iron oxide, mapicoyellow, minium, cadmium yellow, zinc sulfide, lithopone, barium sulfide, cadmium selenide, calcium carbonate, barium sulfate, lead chromate, lead sulfate, barium carbonate, white lead, and alumina white. Examples of the dye include nigrosine-based dye, azo-based dye, phthalocyanine-based dye, quinophthalone-based dye, anthraquinone-based dye, and methine-based dye. Examples of the carbon material include carbon black. Examples of the metal material include gold, silver, and copper. Examples of the metal oxide include titanium oxide, zinc oxide, zirconium oxide, barium titanate, potassium titanate, copper-chromium oxide, copper-manganese oxide, copper-iron-manganese oxide, copper-chromium-manganese oxide, and copper-iron-chromium oxide. Examples of the polymer material include a polymer compound to which a functional group having a light-absorbing region in the visible region is introduced. A type of such a polymer compound is not limited as long as the polymer compound has a light-absorbing region in the visible region.

The content (concentration) of the migrating particles 32 in the insulative liquid 31 is, but not limited to, 0.1 wt % to 10 wt % both inclusive, for example, since such content ensures shielding (covering) performance and mobility of the migrating particles 32. Here, if the content is less than 0.1 wt %, the migrating particles 32 may be less likely to shield the porous layer 33. On the other hand, if the content is more than 10 wt %, dispersibility of the migrating particles 32 decreases and thus the migrating particles 32 are less likely to migrate, and may aggregate in some cases.

The migrating particles 32 have an appropriate optical reflection characteristics (light reflectance). The light reflectance of the migrating particles 32 is preferably, but not limitedly, set such that the migrating particles 32 shield at least the porous layer 33 since a difference in light transmittance between the migrating particles 32 and the porous layer 33 is used to produce contrast.

For example, a specific formation material of the migrating particles 32 is selected depending on a role of the migrating particles 32 to produce contrast. In detail, examples of the material of the migrating particles 32 selected when the migrating particles 32 perform bright display include metal oxide such as titanium oxide, zinc oxide, zirconium oxide, barium titanate, and potassium titanate. On the other hand, examples of the material of the migrating particles 32 selected when the migrating particles 32 perform dark display include a carbon material and metal oxide. Examples of the carbon material include carbon black. Examples of the metal oxide include copper-chromium oxide, copper-manganese oxide, copper-iron-manganese oxide, copper-chromium-manganese oxide, and copper-iron-chromium oxide. In particular, the carbon material is preferable since the carbon material provides high chemical stability, high mobility, and high light absorbability.

In the case of bright display by the migrating particles 32, any externally visible color of the migrating particles 32 may be used without limitation as long as contrast is thereby produced. In particular, the color is preferably whitish, and more preferably white. On the other hand, in the case of dark display by the migrating particles 32, any externally visible color of the migrating particles 32 may be used without limitation as long as contrast is thereby produced. In particular, the color is preferably blackish, and more preferably black. This is because high contrast is obtained in either case.

It is to be noted that the migrating particles 32 are preferably easily dispersed and charged in the insulative liquid 31 and are preferably maintained in such a state for a long period. In addition, the migrating particles 32 are preferably not easily adsorbed in the porous layer 33. Hence, a dispersant (or charge adjuster) may be used to disperse the migrating particles 32 by electrostatic repulsion, or the migrating particles 32 may be surface-treated. Alternatively, these two processes may be combined.

Examples of the dispersant include Solsperse series available from Lubrizol, BYK series or Anti-Terra series available from BYK-Chemie, and Span series available from ICI Americas.

Examples of types of the surface treatment include rosin treatment, surfactant treatment, pigment-derivative treatment, coupling-agent treatment, graft polymerization treatment, and micro-encapsulation treatment. In particular, the graft polymerization treatment, the micro-encapsulation treatment, and a combination thereof are preferable since such types of treatment provide long-term dispersion stability.

Examples of a material used for the surface treatment include a material (an adsorptive material) having a functional group adsorbable on a surface of each migrating particle 32 and a polymerizable functional group. A type of the adsorbable functional group is determined depending on the formation material of the migrating particles 32. For example, the adsorbable functional group includes an aniline derivative such as 4-vinylaniline for the carbon material such as carbon black, and includes an organosilane derivative such as 3-methacryloxypropyltrimethoxysilane for metal oxide. Examples of the polymerizable functional group include a vinyl group, an acrylic group, and a methacrylic group.

In addition, examples of a material used for the surface treatment include a material (graft material) that is allowed to be grafted on a surface of the migrating particle 32 in which the polymerizable functional group is introduced. The graft material preferably has the polymerizable functional group, and a functional group for dispersion, which allows the migrating particles 32 to be dispersed in the insulative liquid 31 and allows dispersability to be maintained by steric hindrance. The type of the polymerizable functional group is similar to that of the adsorptive material as described above. For example, the functional group for dispersion is a branched alkyl group for paraffin as the insulative liquid 31. For example, a polymerization initiator such as azobisisobutyronitrile (AIBN) can be used for polymerization and grafting of the graft material.

Regarding a detailed technique of dispersing the migrating particles 32 in the insulative liquid 31, reference is made to a book such as "Dispersion Technique of Ultrafine Particles and Evaluation Thereof: Surface Treatment, Pulverizing, and Dispersion Stabilization in Gas, Liquid, and Polymer" published by Science & technology Co., Ltd.

[Porous Layer]

As shown in FIGS. 1 and 2, the porous layer 33 includes a three-dimensional structure (an irregular network structure such as a nonwoven fabric) formed of a fibrous structure 33A. The porous layer 33 has one, or two or more gaps (pores 35) for passage of the migrating particles 32 in each region where no fibrous structure 33A exists.

The fibrous structure 33A includes one, or two or more non-migrating particles 33B held by the fibrous structure 33A. The porous layer 33 as the three-dimensional structure may include one randomly-tangled fibrous structure 33A, or may include a plurality of fibrous structures 33A that are gathered in a randomly overlapped and tangled manner. In the case of the plurality of fibrous structures 33A, each fibrous structure 33A preferably includes one, or two or more non-migrating particles 33B. It is to be noted that FIGS. 1 and 2 each illustrate a case where the porous layer 33 is formed of a plurality of fibrous structures 33A, while FIG. 2 shows the fibrous structures 33A in a simplified manner.

The reason why the porous layer 33 includes the three-dimensional structure is that the irregular three-dimensional configuration of the three-dimensional structure facilitates irregular reflection (multiple scattering) of outside light, leading to high light reflectance despite a small thickness of the porous layer 33. This improves contrast, and reduces energy taken for movement of the migrating particles 32. In addition, the three-dimensional structure increases the average pore size of the pores 35 and the number thereof, which facilitates passage of the migrating particles 32 through the pores 35. This further reduces energy and time taken for movement of the migrating particles 32.

The reason why the fibrous structure 33A holds the non-migrating particles 33B is that the non-migrating particles 33B enhance irregular reflection of outside light, resulting in a higher light reflectance of the porous layer 33. As a result, contrast is further increased.

The fibrous structure 33A includes a fibrous substance having a slender shape of which the length (fiber length) is sufficiently large compared with the diameter (fiber diameter). Examples of the fibrous structure 33A include one, or two or more of polymer materials and inorganic materials, but may include other materials. Examples of the polymer materials include nylon, polylactic acid, polyamide, polyimide, polyethylene terephthalate, polyacrylonitrile, polyethylene oxide, polyvinyl carbazole, polyvinyl chloride, polyurethane, polystyrene, polyvinyl alcohol, polysulfone, polyvinylpyrrolidone, polyvinylidene fluoride, polyhexafluoropropylene, cellulose acetate, collagen, gelatin, chitosan, and copolymers thereof. Examples of the inorganic materials include titanium oxide. In particular, the fibrous structure 33A preferably includes the polymer material since the polymer material has a low reactivity such as light reactivity, i.e., the polymer material is chemically stable, leading to suppression of an unintentional decomposition reaction of the fibrous structure 33A. It is to be noted that if the fibrous structure 33A includes a highly reactive material, the surface of the fibrous structure 33A is preferably covered with an appropriate protective layer.

The shape (appearance) of the fibrous structure 33A may be any fibrous shape without limitation as long as the fiber length thereof is sufficiently large compared with the fiber diameter as described above. In detail, the fibrous structure 33A may straightly extend, or may be curled or folded halfway. In addition, the fibrous structure 33A may not only extend in one direction, but also be branched halfway in one, or two or more directions. Examples of a formation method of the fibrous structure 33A preferably, but not limitedly, include one or two or more of a phase separation process, a phase inversion process, an electrostatic (electric field) spinning process, a melt spinning process, a wet spinning process, a dry spinning process, a gel spinning process, a sol-gel process, and a spray coating process. This is because these processes facilitate stable formation of a fibrous substance of which the length is sufficiently large compared with the diameter.

An average fiber diameter of the fibrous structure 33A is preferably, but not limitedly, as small as possible since such small fiber diameter enhances irregular reflection of light, and increases the average pore size of the pores 35. However, the average fiber diameter of the fibrous structure 33A has to be determined such that the fibrous structure 33A includes the non-migrating particles 33B. Hence, the average fiber diameter of the fibrous structure 33A is preferably 10 μm or less. It is to be noted that the lower limit of the average fiber diameter is, but not limited to, for example, 0.1 μm. Alternatively, the lower limit may be less than 0.1 μm. The average fiber diameter is measured by microscopic observation using a scanning electron microscopy (SEM), for example. It is to be noted that the fibrous structure 33A may have an appropriate average length.

The average pore size of the pores 35 is preferably, but not limitedly, as large as possible since such large average pore size facilitates passage of the migrating particles 32 through the pores 35. As a result, the average pore size of the pores 35 is preferably 0.1 μm to 10 μm both inclusive.

Thickness of the porous layer 33 is, but not limited to, for example, 5 μm to 100 μm both inclusive since such thickness improves shielding performance of the porous layer 33, and facilitates passage of the migrating particles 32 through the pores 35. The thickness defined herein refers to the maximum thickness of the porous layer 33.

In particular, the fibrous structure 33A preferably includes nanofiber since the nanofiber causes the three-dimensional structure to be complicated, resulting in enhancement of irregular reflection of outside light. Such a configuration further increases the light reflectivity of the porous layer 33, and increases an area ratio of the pores 35 in the unit area of the porous layer 33, allowing the migrating particles 32 to readily pass through the pores 35. Consequently, contrast further becomes higher, and energy taken for movement of the migrating particles 32 is further reduced. The nanofiber is a fibrous substance of which the fiber diameter is 0.001 μm to 0.1 μm both inclusive, and the fiber length is 100 times as large as the fiber diameter, or larger. The fibrous structure 33A including the nanofiber is preferably formed by an electrostatic spinning process using a polymer material since a fibrous structure 33A having a small fiber diameter is readily and stably formed by the electrostatic spinning process.

The fibrous structure 33A preferably has an optical reflection characteristics different from those of the migrating particles 32. In detail, the light reflectance of the fibrous structure 33A is preferably, but not limitedly, set such that the porous layer 33 as a whole shields the migrating particles 32 at least since a difference in light reflectance between the migrating particles 32 and the porous layer 33 is used to produce contrast, as described before. Accordingly, a fibrous structure 33A, which is light-transmissible (colorless and transparent) in the insulative liquid 31, is not preferable. However, if the light transmittance of the fibrous structure 33A has substantially no influence on the total light transmittance of the porous layer 33, and if the total light transmittance of the porous layer 33 is substantially determined by the light transmittance of the non-migrating particles 33B, the fibrous structure 33A may have an arbitrary light transmittance.

The non-migrating particles 33B are held (fixed) by the fibrous structure 33A and do not electrically migrate. The formation material of the non-migrating particles 33B is, for example, similar to the formation material of the migrating particles 32, and is selected depending on a role of the non-migrating particles 33B as described later. It is to be noted that the non-migrating particles 33B can be partially exposed from the fibrous structure 33A, or can be buried in the inside of the fibrous structure 33A.

The non-migrating particles 33B have an optical reflection characteristics different from those of the migrating particles 32. The light reflectance of the non-migrating particles 33B is preferably, but not limitedly, set such that the porous layer 33 as a whole shields the migrating particles 32 at least since a difference in light transmittance between the migrating particles 32 and the porous layer 33 is used to produce contrast, as described before.

For example, a specific formation material of the non-migrating particles 33B is selected depending on a role of the non-migrating particles 33B to produce contrast. In detail, a material of the non-migrating particles 33B selected when the non-migrating particles 33B perform bright display is similar to the material of the migrating particles 32 selected when the migrating particles 32 perform bright display. On the other hand, a material of the non-migrating particles 33B selected when the non-migrating particles 33B perform dark display is similar to the material of the migrating particles 32 selected when the migrating particles 32 perform dark display. In particular, metal oxide is preferable as the material of the non-migrating particles 33B selected when the non-migrating particles 33B perform bright display, and titanium oxide is more preferable since titanium oxide has high electrochemical stability and high fixability, and provides high reflectance. The type of the formation material of the non-migrating particles 33B may be to the same as or different from that of the formation material of the migrating particles 32, as long as the formation material allows production of contrast.

It is to be noted that, in the case where the non-migrating particles 33B perform light display or dark display, a visible color of the non-migrating particles 33B is similar to that of the migrating particles 32 as described above.

[Preferable Displaying Method by Electrophoresis Device]

The electrophoresis device 30 produces contrast using a difference in light transmittance between the migrating particles 32 and the porous layer 33 as described above. In that case, the migrating particles 32 may perform dark display while the porous layer 33 performs light display, and the reverse is also acceptable. Such different roles of the migrating particles 32 and the porous layer 33 are determined depending on a magnitude relationship between the light transmittance of the migrating particles 32 and that of the porous layer 33. Specifically, light reflectance of one for light display is set high compared with that of the other for dark display.

In particular, the light transmittance of the porous layer 33 is higher than the light transmittance of the migrating particles 32. Hence, preferably, the migrating particles 32 perform dark display while the porous layer 33 performs light display. Accordingly, in the case where the light transmittance of the porous layer 33 is substantially determined by the light transmittance of the non-migrating particles 33B, the light transmittance of the non-migrating particles 33B is preferably higher than the light transmittance of the migrating particles 32 since light reflectance of the porous layer 33 for light display extremely increases through irregular reflection of outside light by the porous layer 33, and accordingly contrast extremely increases.

[Dividing Wall]

The dividing wall 34 is light-transmissive and partitions a space in which the migrating particles 32 are allowed to exist in the insulative liquid 31. As shown in FIG. 1, the dividing wall 34 extends along a migrating direction of the migrating particles 32 while including part of the porous layer 33, and thus partitions a space filled with the insulative liquid 31 into a plurality of sub-spaces (cells 36 described later). It is to be noted that, for example, the dividing wall 34 is adjacent at one end to the planarization insulating layer 14, and adjacent at the other end to the counter electrode 22.

The phrase "the dividing wall 34 includes part of the porous layer 33" refers to that, while the non-migrating particles 33B are held by the fibrous structure 33A, i.e., while the configuration of the porous layer 33 is maintained, part of the porous layer 33 is accommodated, in the state as it is, in the inside of the dividing wall 34. In addition, "migrating direction of the migrating particles 32" is a direction along which the migrating particles 32 move toward the pixel electrodes 15 or the counter electrode 22, namely, the Z-axis direction in FIGS. 1 to 3.

The dividing wall 34 is light-transmissive and includes part of the porous layer 33, which is to suppress a reduction in contrast due to existence of the dividing wall 34. In detail, if the dividing wall 34 is not light-transmissive, dark display is unintentionally performed by the dividing wall 34 itself, so that the total light reflectance of the electrophoresis device 30 is reduced during light display. On the other hand, if the dividing wall 34 is light-transmissive, dark display is less likely to be performed by the dividing wall 34 itself, so that the total light reflectance of the electrophoresis device 30 is less likely to be reduced during light display. In addition, since light is irregularly reflected by the non-migrating particles 33B included in the dividing wall 34, the total light reflectance of the electrophoresis device 30 is further less likely to be reduced. As a result, even if the dividing wall 34 exists, contrast is affected little thereby.

The formation material of the dividing wall 34 includes any light-transmissive material without limitation. In particular, the dividing wall 34 preferably includes one, or two or more of photosensitive materials since such a photosensitive material facilitates stable formation of the dividing wall 34 including part of the porous layer 33 during a manufacturing process of a display. Examples of the photosensitive material include a photosensitive resin (photo-curing resin), which is allowed to be photo-patterned, of a photocrosslinking reaction type, a photomodification type, a photopolymerization reaction type, or a photodecomposition reaction type. Specific examples of the photosensitive resin include a negative and positive type of photoresist since the photoresist is chemically stable, and therefore, is less likely to affect the migrating phenomenon of the migrating particles 32. Examples of a type of light (light source) for photo-patterning of the photosensitive material include, but not limited to, a semiconductor laser, an excimer laser, electron beams, ultraviolet rays, a metal halide lamp, and a high-pressure mercury vapor lamp.

It is to be noted that the width W of the dividing wall 34 is constant in an extending direction of the dividing wall 34, for example. In addition, the height H of the dividing wall 34 is constant, for example.

As shown in FIGS. 1 and 3, the dividing wall 34 defines one, or two or more spaces (cells 36) for accommodating the migrating particles 32. Although the number and the arrangement pattern of the cells 36 are not limited, for example, the cells 36 are preferably arranged in a matrix (in rows and columns) in order to efficiently define and arrange the cells 36. In addition, for example, as shown in FIG. 3, the shape (opening shape) of the cell 36 may be, but not limited to, a rectangular shape, or may be another shape such as a hexagonal shape.

It is to be noted that dimensions of the dividing wall 34 are freely set without limitation. For example, the pitch of the dividing wall 34 may be 30 μm to 300 μm both inclusive, preferably, 100 μm to 200 μm both inclusive, and the height H thereof may be 5 μm to 150 μm both inclusive, preferably, 10 μm to 50 μm both inclusive.

[Spacer]

For example, the spacer 40 includes one, or two or more of insulating materials such as polymer materials. The spacer 40, however, may be configured of a seal member, in which fine particles are mixed, without limitation.

The spacer 40 preferably, but not limitedly, has a shape that does not disturb the movement of the migrating particles 32, and allows the migrating particles 32 to be uniformly distributed, for example, a lattice shape. In addition, the thickness of the spacer 40 is preferably, but not limitedly, as thin as possible in order to reduce power consumption, and, for example, 10 μm to 100 μm both inclusive.

[Operation of Display]

Figure 4:
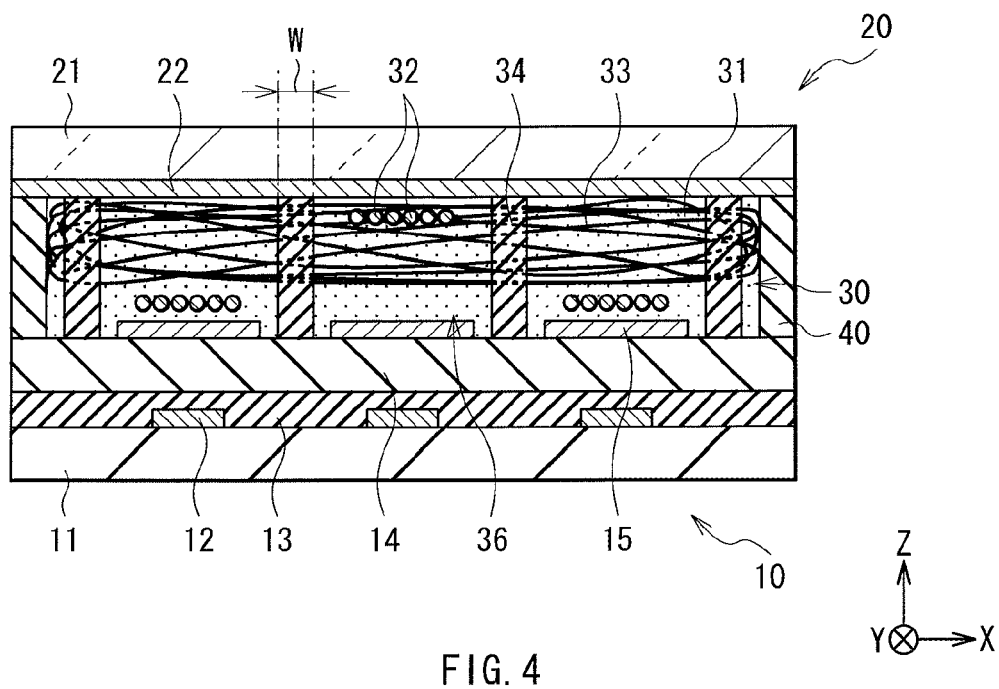
FIG. 4 is a sectional view for explaining operation of the display.

The display operates in the following manner. FIG. 4 is for explaining operation of the display, showing a sectional configuration corresponding to FIG. 1.

Here, for example, the light reflectance of the non-migrating particles 33B is higher than that of the migrating particles 32. Hence, description is made on a case where the migrating particles 32 perform dark display while the porous layer 33 performs light display.

In the initial state, as shown in FIG. 1, the migrating particles 32 dispersed in the insulative liquid 31 are located in a region closer to the pixel electrodes 15 in all cells 36. In this state, when the electrophoresis device 30 is viewed from a counter substrate 20 side of the display, the migrating particles 32 are shielded by the porous layer 33 (light display is performed) in all cells 36. Hence, contrast is not produced, i.e., no image is displayed.

An electric filed is applied between the pixel electrodes 15 and the counter electrode 22 of the cell 36 that is selected by the TFT 12. Thus, as shown in FIG. 4, the migrating particles 32 move to the counter electrode 22 through the pores 35 in the porous layer 33 in the cell 36 to which the electric filed is applied. In this situation, when the electrophoresis device 30 is viewed from the counter substrate 20 side of the display, two types of cells 36 (pixels) coexist depending on whether or not the porous layer 33 is shielded by the migrating particles 32. Specifically, there are a pixel where the migrating particles 32 are shielded by the porous layer 33 (light display is performed) and a pixel where the migrating particles 32 are not shielded by the porous layer 33 (dark display is performed). Such different display colors are used to produce contrast, and the display color (light display or dark display) is switched for the individual cells 36. Consequently, an image is displayed with overall contrast across the cells.

[1-2. Manufacturing Method]

The display is manufactured according to the following procedure. FIGS. 5 to 8 are for explaining a method of manufacturing the display, each showing a sectional configuration corresponding to FIG. 1. It is to be noted that the formation material of each component has been described in detail, and description of them is omitted below.

Figure 5:
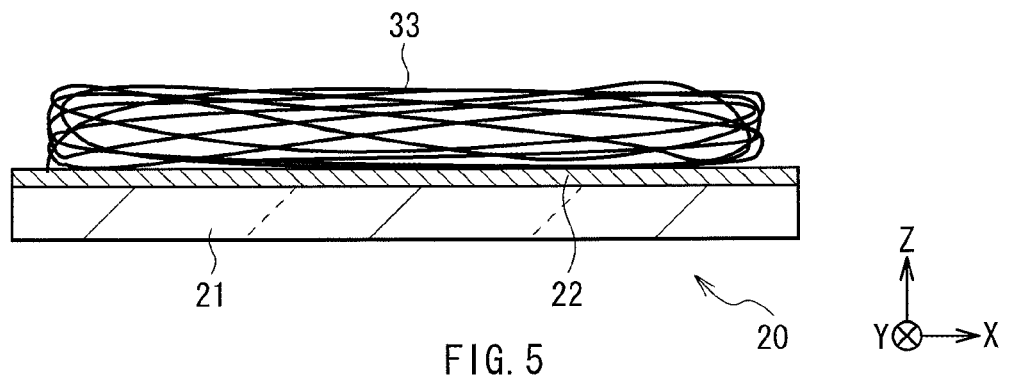
FIG. 5 is a sectional view for explaining a method of manufacturing the display.

First, as shown in FIG. 5, the counter electrode 22 is formed on one surface of the support substrate 21 to produce the counter substrate 20. The counter electrode 22 is formed by an existing process, which is selected as necessary, such as various types of deposition processes.

Then, the porous layer 33 is formed on the counter electrode 22 according to the following procedure, for example. First, the formation material (for example, a polymer material) of the fibrous structure 33A is dispersed or dissolved in an organic solvent and/or the like to prepare a spinning solution. Then, the non-migrating particles 33B are added into the spinning solution that is then sufficiently stirred to disperse the non-migrating particles 33B. Finally, a structure is spun by an electrostatic spinning process using the spinning solution. Consequently, the non-migrating particles 33B are held by the fibrous structure 33A, resulting in formation of the porous layer 33.

Figure 6:
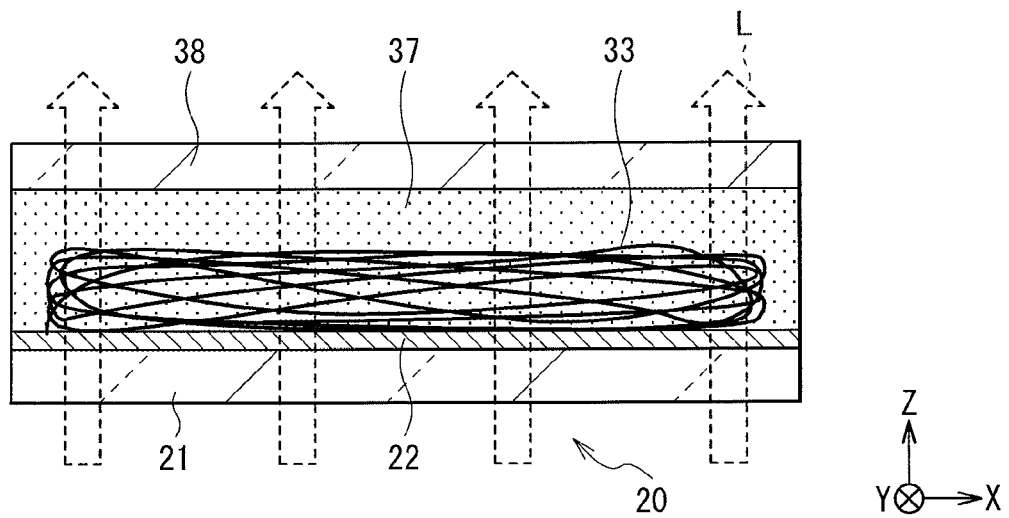
FIG. 6 is a sectional view for explaining a step following FIG. 5.

Then, a solution containing the formation material of the dividing wall 34 (for example, a photosensitive solution 37 containing a photosensitive material) is prepared. In this process, the formation material of the dividing wall 34 may be dissolved or dispersed in an organic solvent and/or the like as necessary. Then, as shown in FIG. 6, the photosensitive solution 37 is applied on the surface of the counter electrode 22 such that the porous layer 33 is buried in the photosensitive solution 37, and then, for example, an auxiliary substrate 38 is disposed on the photosensitive solution 37. The auxiliary substrate 38 controls the coating thickness of the photosensitive solution 37 (controls the height H of the dividing wall 34 formed in a downstream process). For example, the auxiliary substrate 38 is formed of a material similar to that of the support substrate 21. It is to be noted that the auxiliary substrate 38 may be light-transmissive, light-reflective, or light-absorptive, and, for example, a light-transmissive auxiliary substrate 38 is used herein. In that case, for example, a negative-type photoresist (UV resin) that is reactive to light in a UV wavelength region is used as a formation material of the dividing wall 34, and the coating thickness of the photosensitive solution 37 is set such that the porous layer 33 is buried in the photosensitive solution 37.

Then, the photosensitive solution 37 is photopatterned. In detail, for example, light L is applied from a support substrate 21 side of the display to selectively expose the photosensitive solution 37. In this process, the light L is applied for a formation region of the dividing wall 34 so as to expose the photosensitive solution 37 in the formation region. In this exposure step, for example, both the support substrate 21 and the auxiliary substrate 38 are light-transmissive. The applied light L is therefore transmitted by the support substrate 21 and arrives at the photosensitive solution 37, and then is transmitted by the auxiliary substrate 38 through the photosensitive solution 37. The light L is, for example, a laser in a UV wavelength region since the photosensitive solution 37 is scanned with the laser light, enabling a desired region to be exposed simply and accurately without a mask. Alternatively, the light L may be collimated light (parallel light), for example.

Figure 7:
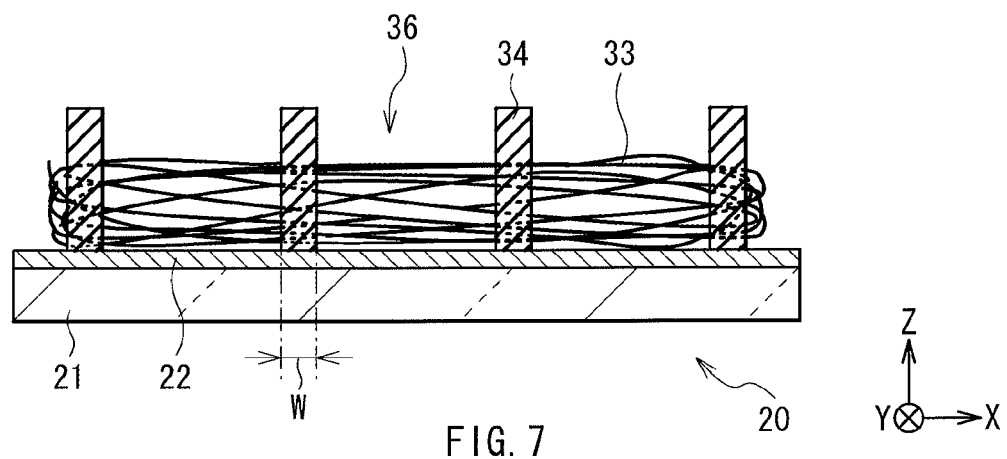
FIG. 7 is a sectional view for explaining a step following FIG. 6.

Then, the auxiliary substrate 38 is removed and the exposed photosensitive solution 37 is developed, and then the developed photosensitive solution 37 is heated as necessary. As a result, an unexposed portion of the photosensitive solution 37 is removed, and a residual portion (exposed portion) thereof is formed into a film. Consequently, as shown in FIG. 7, the dividing wall 34 including part of the porous layer 33 is formed in the exposed portions. The auxiliary substrate 38 controls the coating thickness of the photosensitive solution 37 to be substantially constant. Accordingly, the height H of the dividing wall 34 becomes substantially constant.

Figure 8:
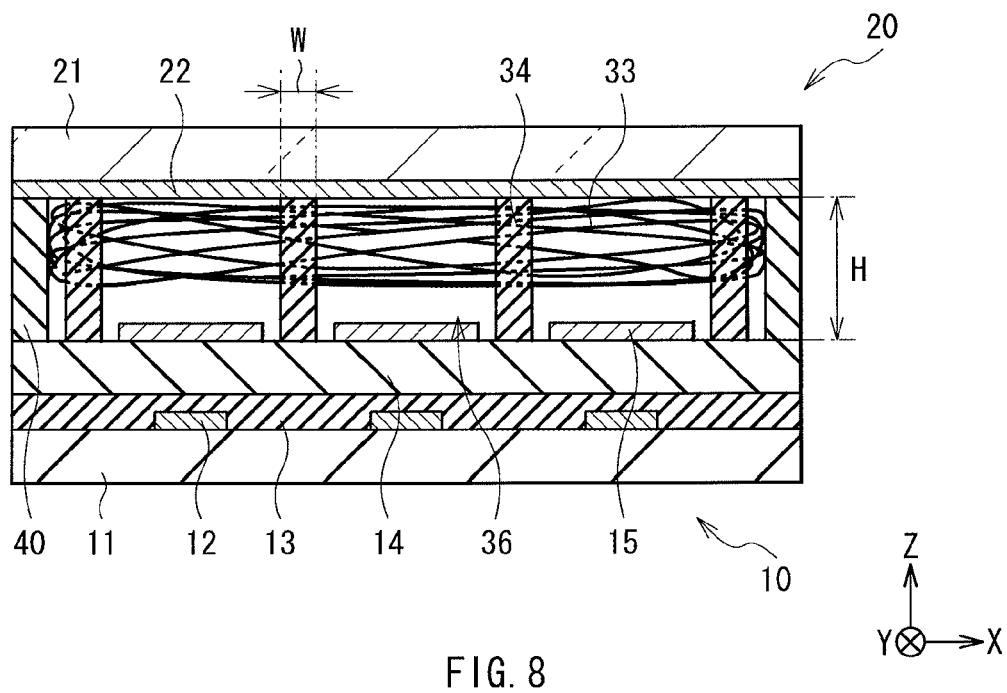
FIG. 8 is a sectional view for explaining a step following FIG. 7.

Then, as shown in FIG. 8, the TFTs 12, the protective layer 13, the planarization insulating layer 14, and the pixel electrodes 15 are formed in this order on one surface of the support substrate 11 to produce the drive substrate 10. Each component of the drive substrate 10 is formed by, for example, an existing process selected as necessary. It is to be noted that the drive substrate 10 may be beforehand prepared.

Then, the drive substrate 10 and the counter substrate 20 are disposed to be opposed to each other with the spacer 40 therebetween. In this operation, for example, a distance between the drive substrate 10 and the counter substrate 20 is adjusted such that one end of the dividing wall 34 is adjacent to the planarization insulating layer 14.

Finally, the insulative liquid 31 in which the migrating particles 32 are dispersed is prepared. Then, as shown in FIG. 1, the insulative liquid 31 is filled into a space enclosed by the drive substrate 10, the counter substrate 20, and the spacer 40. The insulative liquid 31 may be beforehand prepared. This is the end of manufacturing of the display.

It is to be noted that although the drive substrate 10 and the counter substrate 20 are disposed to be opposed to each other before filling of the insulative liquid 31, this is not limitative. For example, the insulative liquid 31 may be applied on the counter substrate 20 having the porous layer 33 formed thereon so that the pores 35 of the porous layer 33 are impregnated with the insulative liquid 31, before the counter substrate 20 is disposed to be opposed to the drive substrate 10. For example, the insulative liquid 31 may be applied by dropping of the insulative liquid 31 or by a printing process in the case where the insulative liquid 31 is applied.

[1-3. Function and Effect]

According to the electrophoresis device and the display, the porous layer 33 is formed of the fibrous structure 33A that includes the non-migrating particles 33B having an optical reflection characteristics different from those of the migrating particles 32. In addition, the dividing wall 34 is light-transmissive, and includes part of the porous layer 33.

In this configuration, first, although the porous layer 33 has the pores 35 having sufficient number and size for the migrating particles 32 to pass through the pores 35, the porous layer 33 irregularly reflects outside light despite its small thickness. In particular, outside light is irregularly reflected not only by the fibrous structure 33A but also by the non-migrating particles 33B. This improves the light reflectance of the porous layer 33, resulting in higher contrast. In addition, this facilitates passage of the migrating particles 32 through the pores 35, resulting in a reduction in time and in energy taken for movement of the migrating particles 32.

Second, since the light-transmissive dividing wall 34 includes part of the porous layer 33, even if the dividing wall 34 exists, the total light reflectance of the electrophoresis device 30 is less likely to be reduced during light display. In particular, since light is irregularly reflected by the non-migrating particles 33B included in the dividing wall 34, the total light reflectance of the electrophoresis device 30 is further less likely to be reduced. As a result, even if the dividing wall 34 exists, contrast is substantially not affected thereby, leading to suppression of a reduction in contrast due to existence of the dividing wall 34.

Third, since the porous layer 33 is supported by the dividing wall 34, even if the display is left for a long time while being turned sideways or upside down, a position of the porous layer 33 in the insulative liquid 31 is less likely to vary. Here, "position of the porous layer 33" refers to a positional relationship, for example, a distance, between the porous layer 33 and the pixel electrode 15 or the counter electrode 22. This suppresses a variation in mobility of the migrating particles 32 through the pores 35 of the porous layer 33, resulting in stable contrast.

Fourth, since the dividing wall 34 partitions a space in which the migrating particles 32 are allowed to exist, the migrating particles 32 are less likely to move to an adjacent cell 36. This suppresses diffusion, convection, and aggregation of the migrating particles 32, and thus suppresses a reduction in image quality such as unevenness in display.

Consequently, high contrast, high-speed response, and low power consumption are achieved. As a result, the display shows a high-grade image at low power consumption.

In addition, the fibrous structure 33A is formed by the electrostatic spinning process, or the fibrous structure 33A includes nanofiber. This allows a three-dimensional structure, which enhances irregular reflection of outside light, to be readily formed. Moreover, this further increases pore size of and the number of the pores 35. Consequently, a higher effect is obtained.

In addition, the light reflectance of the non-migrating particles 33B is higher than that of the migrating particles 32. Hence, the migrating particles 32 perform dark display and the porous layer 33 performs light display, so that the light reflectance of the porous layer 33 is extremely improved through irregular reflection of outside light.

In addition, according to the method of manufacturing the electrophoresis device, the photosensitive solution 37 is applied such that the porous layer 33 is buried in the photosensitive solution 37, and then the photosensitive solution 37 is exposed and developed, so that the light-transmissive dividing wall 34 including part of the porous layer 33 is formed. Consequently, an electrophoresis device that exhibits high contrast and high-speed response at low power consumption is achieved. In this case, particularly the dividing wall 34 is readily formed in a highly reproducible manner.

In addition, the auxiliary substrate 38 that controls coating thickness of the photosensitive solution 37 is disposed on the photosensitive solution 37 that is then exposed and developed. This allows the dividing wall 34 to be formed with substantially constant height H.

[1-4. Modifications]

Figure 9:
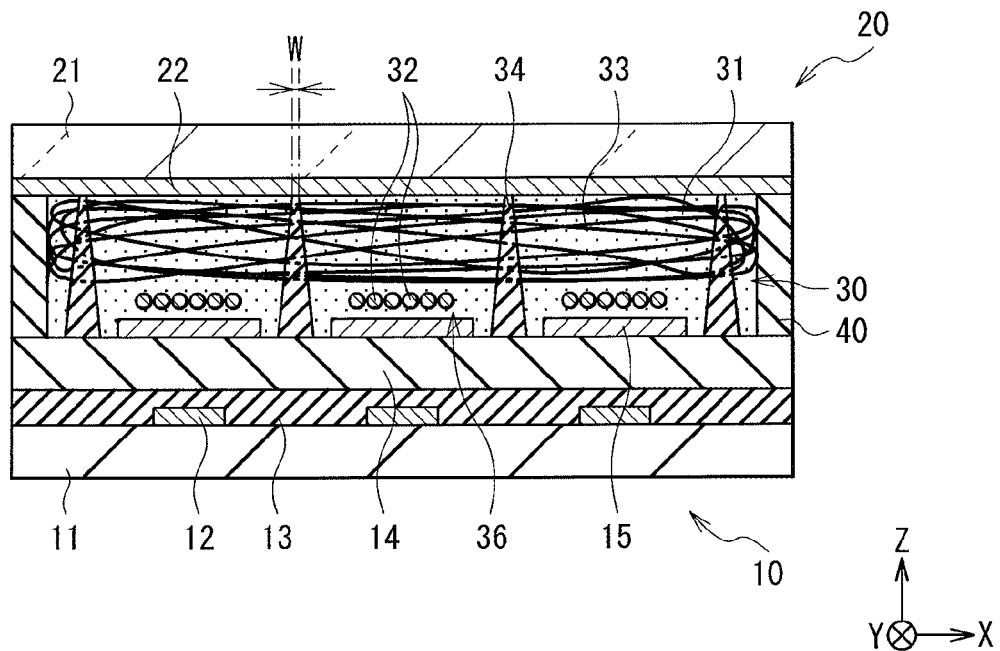
FIG. 9 is a sectional view illustrating a modification of the configuration of the display.
Figure 10:
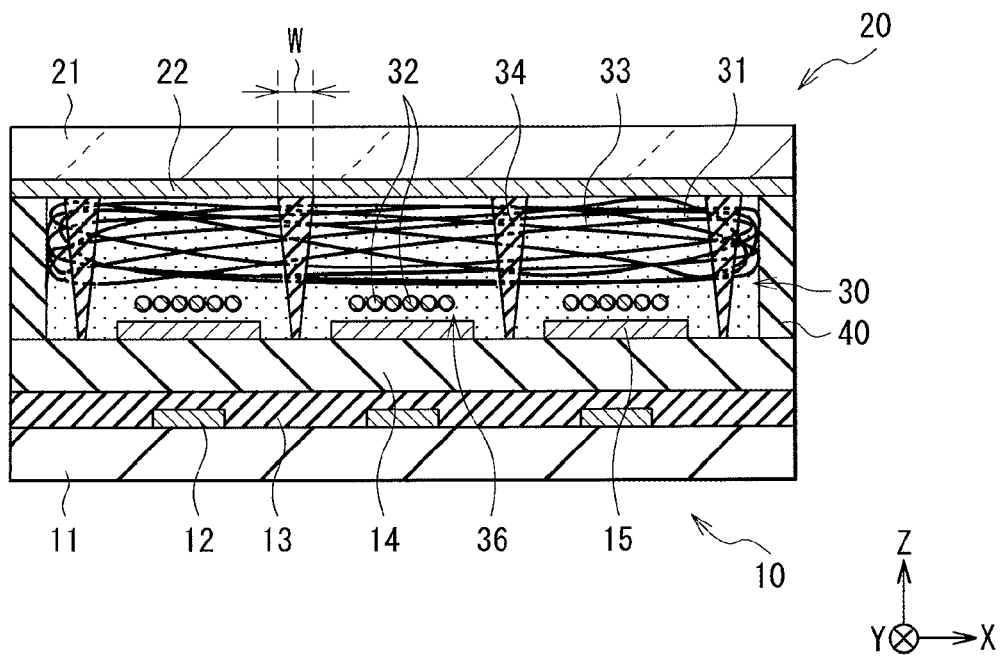
FIG. 10 is a sectional view illustrating another modification of the configuration of the display.

The shape of the dividing wall 34 is allowed to be appropriately modified. For example, in the case where a photosensitive material is used as a formation material of the dividing wall 34, the shape of the dividing wall 34 is controlled depending on an exposure condition and a light incidence condition during photopatterning of the photosensitive material. Accordingly, the width W of the dividing wall 34 may be not necessarily uniform (constant) in an extending direction of the dividing wall 34, but may be non-uniform. For example, as shown in FIG. 9, the width W may be gradually narrowed as approaching the counter substrate 20 (image display side). Alternatively, as shown in FIG. 10, the width W may be gradually widened as approaching the counter substrate 20. A slope angle (so-called taper angle) of the side face of the dividing wall 34 is, for example, but not limited to, 60° to 90° both inclusive, and preferably 75° to 85° both inclusive. For example, the width W of the dividing wall 34 is controlled by modifying a condition of irradiation intensity, irradiation time, and/or the like of light L during exposure (see FIG. 6) of the photosensitive solution 37. In each case, effects similar to those described above are obtained.

In particular, in the case where the width W is gradually narrowed as approaching the counter substrate 20 (FIG. 9), an opening region of each cell 36 is widened toward the image display side, allowing an image display region to be expanded. On the other hand, in the case where the width W is gradually widened as approaching the counter substrate 20 (FIG. 10), contact area of the dividing wall 34 to the counter substrate 20 increases, thus allowing adhesion of the dividing wall 34 to the counter substrate 20 to be improved. Consequently, the dividing wall 34 is more stably supported.

[2. Display Substrate Including Electrophoresis Device]

Figure 11:
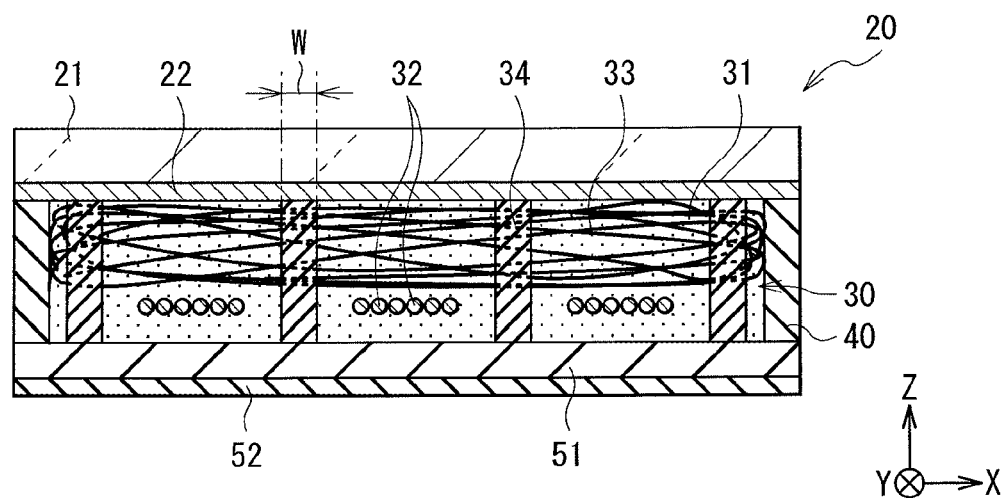
FIG. 11 is a sectional view illustrating a configuration of a display substrate including the electrophoresis device according to the embodiment of the present technology.
Figure 12:
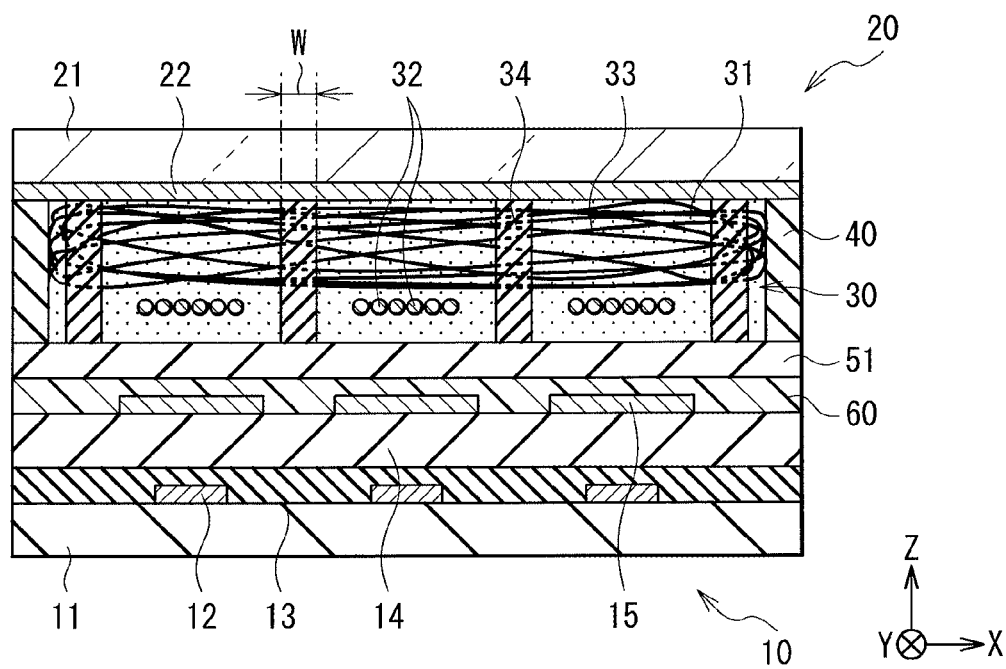
FIG. 12 is a sectional view for explaining usage of the display substrate.

A configuration of a display substrate including the electrophoresis device according to the embodiment of the technology is now described. FIGS. 11 and 12 are for explaining the configuration and usage of the display substrate, each showing a sectional configuration corresponding to FIG. 1. It is to be noted that the same components as those of the previously described display are designated by the same symbols in FIGS. 11 and 12. The following description is made while description of the same components is appropriately omitted, and the same components are appropriately quoted.

The electrophoresis device according to the embodiment of the technology is applicable not only to the above-described display, but also to a display substrate used to produce the display. For example, as shown in FIG. 11, the display substrate has a configuration similar to that of the display except that a protective layer (or a sealing layer) 51 and a separation substrate 52 are provided in place of the drive substrate 10.

Examples of the protective layer 51 include a polymer material such as acrylic-based resin, epoxy-based resin, and urethane-based resin. For example, the separation substrate 52 includes a polymer sheet including PET and/or the like, and is separated from the protective layer 51 as necessary.

For example, as shown in FIG. 12, the display substrate is bonded to the drive substrate 10 with an adhesion layer (or tack layer) 60 therebetween after the separation substrate 52 is separated from the protective layer 51. This is the end of manufacturing of the display. Examples of the adhesion layer 60 include an adhesion sheet including acrylic-based resin, urethane resin-based, rubber, and/or the like.

It is to be noted that the manufacturing procedure of the display substrate is similar to that of the display except that the protective layer 51 and the separation substrate 52 are provided in place of the drive substrate 10, for example.

The display substrate has a configuration similar to that of the counter substrate 20 (electrophoresis device 30) of the display in that the porous layer 33 and the dividing wall 34 are included, and thus has functions similar to those of the display. Consequently, high contrast, high-speed response, and low power consumption are achieved. Other effects and modifications of the display substrate are similar to those of the display.

[3. Application Examples (Electronic Units) of Display and Display Substrate]

Application examples of the above-described display are now described.

The display according to the embodiment of the technology is used for electronic units for various applications, and a type of the electronic unit is not specifically limited. For example, the display may be mounted on the following electronic units. However, the following electronic units are each merely shown as an example, and therefore configurations thereof may be appropriately modified.

Figure 13A:
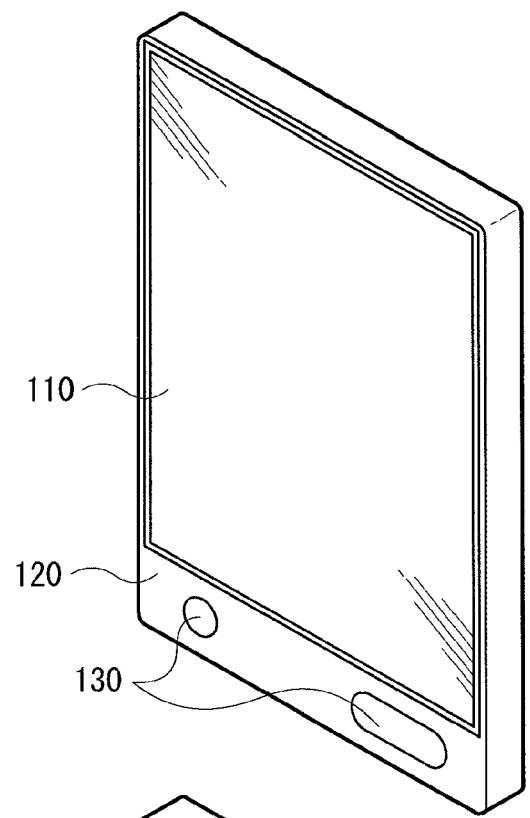
FIGS. 13A and 13B are perspective views each illustrating a configuration of an electronic book including the display.
Figure 13B:
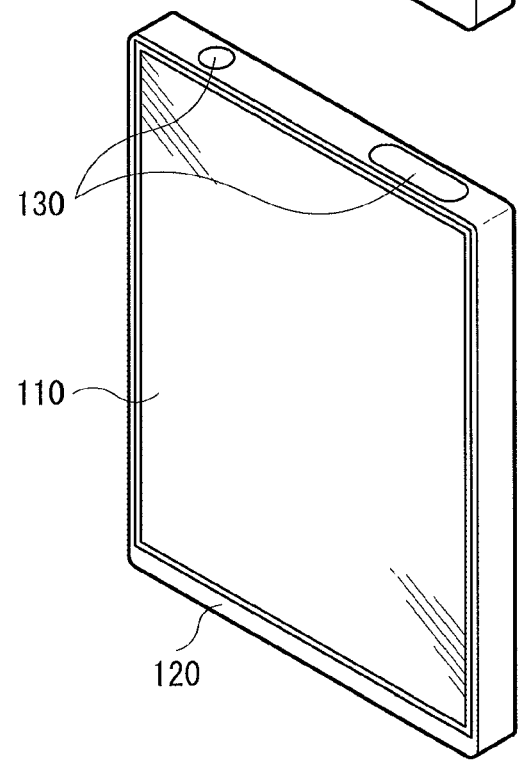

FIGS. 13A and 13B illustrate an appearance configuration of an electronic book. The electronic book has, for example, a display section 110, a non-display section (housing) 120, and an operational section 130. It is to be noted that the operational section 130 can be provided on a front surface of the non-display section 120 as shown in FIG. 13A, or can be provided on a top surface thereof as shown in FIG. 13B. It is to be noted that the display may be mounted on PDA having a configuration similar to that of the electronic book shown in FIGS. 13A and 13B.

Figure 14:
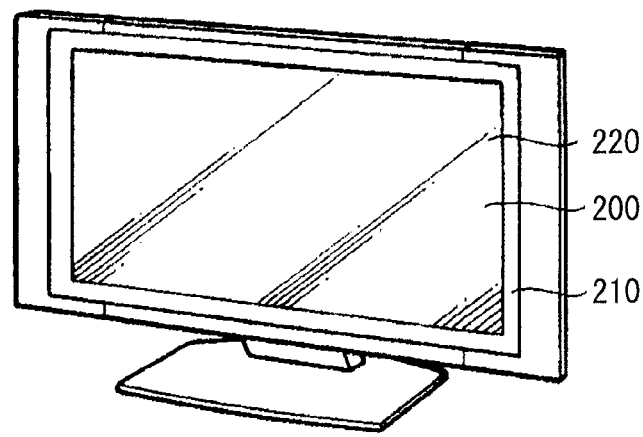
FIG. 14 is a perspective view illustrating a configuration of a television apparatus including the display.

FIG. 14 illustrates an appearance configuration of a television apparatus. The television apparatus has, for example, an image display screen section 200 including a front panel 210 and a filter glass 220.

Figure 15A:
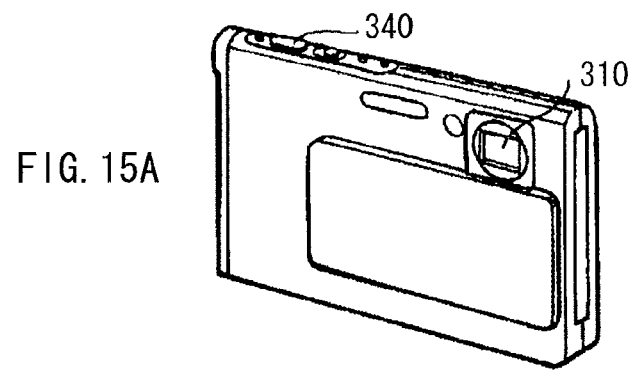
FIGS. 15A and 15B are perspective views each illustrating a configuration of a digital still camera including the display.
Figure 15B:
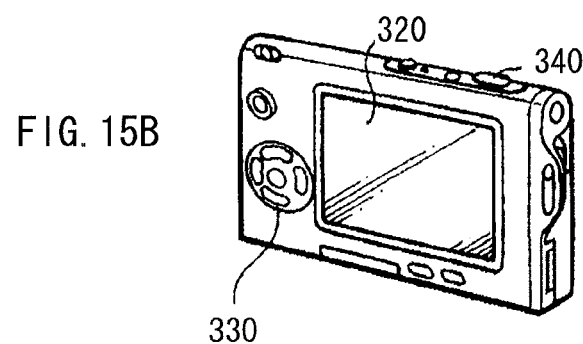

FIGS. 15A and 15B illustrate an appearance configuration of a digital still camera, showing a front surface of the digital still camera and a back surface thereof, respectively. The digital still camera has, for example, a light emitting section 310 for flash, a display section 320, a menu switch 330, and a shutter button 340.

Figure 16:
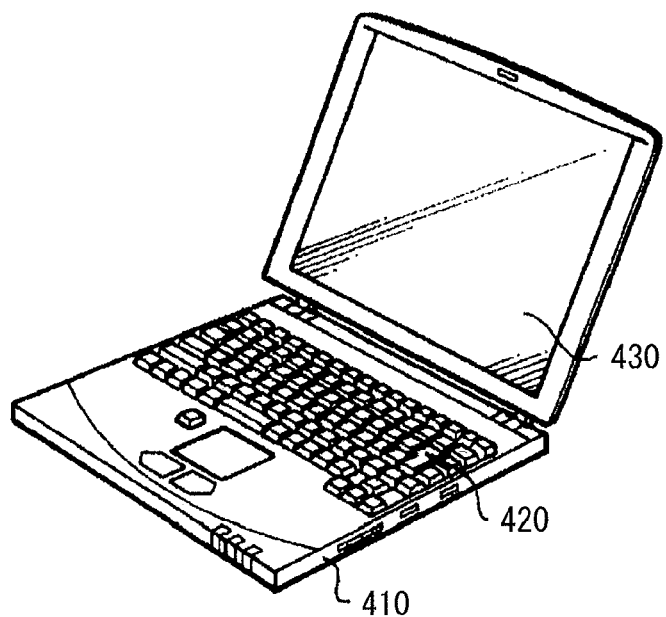
FIG. 16 is a perspective view illustrating a configuration of a personal computer including the display.

FIG. 16 illustrates an appearance configuration of a notebook personal computer. The notebook personal computer has, for example, a main body 410, a keyboard 420 for input operation of characters and the like, and a display section 430 that displays images.

Figure 17:
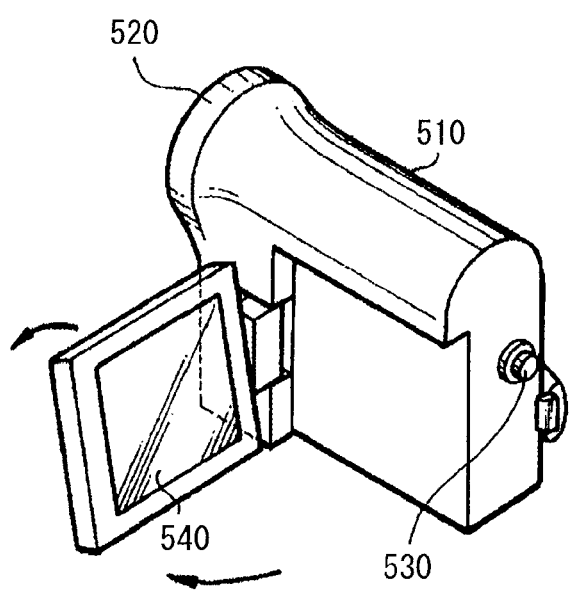
FIG. 17 is a perspective view illustrating appearance of a video camcorder including the display.

FIG. 17 illustrates an appearance configuration of a video camcorder. The video camcorder has, for example, a main body section 510, an object-shooting lens 520 provided on a front surface of the main body section 510, a start-and-stop switch 530 for shooting, and a display section 540.

FIGS. 18A to 18G illustrate an appearance configuration of a mobile phone. FIGS. 18A and 18B illustrate a front surface and a side surface of the mobile phone in an open state, respectively. FIGS. 18C to 18G illustrate a front surface, a left side surface, a right side surface, a top surface, and a bottom surface of the mobile phone in a closed state, respectively. For example, the mobile phone is configured of an upper housing 610 and a lower housing 620 connected to each other by a hinge section 630, and has a display 640, a sub-display 650, a picture light 660, and a camera 670.

Although the present technology has been described with the embodiment hereinbefore, the present technology is not limited thereto, and various modifications or alterations may be made. For example, the electrophoresis device and the method of manufacturing the electrophoresis device according to the embodiments of the technology may be applied to any electronic unit other than the display.

It is possible to achieve at least the following configurations from the above-described example embodiments and the modifications of the disclosure.

(1) An electrophoresis device, including:
a migrating particle;
a porous layer including a fibrous structure holding a non-migrating particle having optical reflection characteristics different from optical reflection characteristics of the migrating particle; and
a light-transmissive dividing wall including part of the porous layer.

(2) The electrophoresis device according to (1), wherein the dividing wall includes a photosensitive material.

(3) The electrophoresis device according to (2), wherein the photosensitive material is a photoresist.

(4) The electrophoresis device according to any one of (1) to (3), wherein the fibrous structure includes one or both of a polymer material and an inorganic material, and is formed by an electrostatic spinning process, and
average fiber diameter of the fibrous structure is about 10 micrometers or less.

(5) The electrophoresis device according to any one of (1) to (4), wherein the migrating particle and the non-migrating particle each include one, or two or more of organic pigment, inorganic pigment, dye, a carbon material, a metal material, metal oxide, glass, and a polymer material.

(6) The electrophoresis device according to any one of (1) to (5), wherein light reflectance of the non-migrating particle is higher than light reflectance of the migrating particle.

(7) A display including:
an electrophoresis device between a pair of substrates, one or both of the substrates being light-transmissive, the electrophoresis device including
a migrating particle,
a porous layer including a fibrous structure holding a non-migrating particle having optical reflection characteristics different from optical reflection characteristics of the migrating particle, and
a light-transmissive dividing wall including part of the porous layer.

(8) A display substrate including:
an electrophoresis device on one surface of a light-transmissive substrate, the electrophoresis device including
a migrating particle,
a porous layer including a fibrous structure holding a non-migrating particle having optical reflection characteristics different from optical reflection characteristics of the migrating particle, and
a light-transmissive dividing wall including part of the porous layer.

(9) An electronic unit including:
a display including an electrophoresis device between a pair of substrates, one or both of the substrates being light-transmissive, the electrophoresis device including
a migrating particle,
a porous layer including a fibrous structure holding a non-migrating particle having optical reflection characteristics different from optical reflection characteristics of the migrating particle, and
a light-transmissive dividing wall including part of the porous layer.

(10) A method of manufacturing an electrophoresis device, the method including:
forming a porous layer;
applying a photosensitive solution to allow the porous layer to be buried in the photosensitive solution; and
exposing and developing the photosensitive solution to form a light-transmissive dividing wall including part of the porous layer, wherein the porous layer includes a fibrous structure holing a non-migrating particle having optical reflection characteristics different from optical reflection characteristics of a migrating particle.

(11) The method according to (10), wherein a substrate controlling coating thickness is disposed on the photosensitive solution before the exposing and the developing of the photosensitive solution.

The present disclosure contains subject matter related to that disclosed in Japanese Priority Patent Application JP 2011-184946 filed in the Japan Patent Office on Aug. 26, 2011, the entire content of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. An electrophoresis device, comprising:
   a migrating particle;
   a porous layer including a fibrous structure holding a non-migrating particle having optical reflection characteristics different from optical reflection characteristics of the migrating particle, the non-migrating particle being partially exposed from the fibrous structure; and
   a dividing wall comprising a photosensitive material.

2. The electrophoresis device according to claim 1, wherein the photosensitive material is a photoresist.

3. The electrophoresis device according to claim 1, wherein the fibrous structure includes one or both of a polymer material and an inorganic material, and is formed by an electrostatic spinning process, and
   average fiber diameter of the fibrous structure is about 10 micrometers or less.

4. The electrophoresis device according to claim 1, wherein the migrating particle and the non-migrating particle each include one, or two or more of organic pigment, inorganic pigment, dye, a carbon material, a metal material, metal oxide, glass, and a polymer material.

5. The electrophoresis device according to claim 1, wherein light reflectance of the non-migrating particle is higher than light reflectance of the migrating particle.

6. The electrophoresis device according to claim 1, wherein the dividing wall is light-transmissive.

7. The electrophoresis device according to claim 1, wherein the dividing wall includes part of the porous layer.

8. A display comprising:
   an electrophoresis device between a pair of substrates, one or both of the substrates being light-transmissive, the electrophoresis device including
   a migrating particle,
   a porous layer including a fibrous structure holding a non-migrating particle having optical reflection characteristics different from optical reflection characteristics of the migrating particle, the non-migrating particle being partially exposed from the fibrous structure, and
   a dividing wall comprising a photosensitive material.

9. A display substrate comprising:
   an electrophoresis device on one surface of a light-transmissive substrate, the electrophoresis device including
   a migrating particle,
   a porous layer including a fibrous structure holding a non-migrating particle having optical reflection characteristics different from optical reflection characteristics of the migrating particle, the non-migrating particle being partially exposed from the fibrous structure, and
   a dividing wall comprising a photosensitive material.

10. An electronic unit comprising:
    a display including an electrophoresis device between a pair of substrates, one or both of the substrates being light-transmissive, the electrophoresis device including
    a migrating particle,
    a porous layer including a fibrous structure holding a non-migrating particle having optical reflection characteristics different from optical reflection characteristics of the migrating particle, the non-migrating particle being partially exposed from the fibrous structure, and
    a dividing wall comprising a photosensitive material.

11. A display, comprising:
    an electrophoresis device between a pair of substrates, one or both of the substrates being light-transmissive, the electrophoresis device comprising:
    a migrating particle;
    a porous layer comprising a fibrous structure holding a non-migrating particle having optical reflection characteristics different from optical reflection characteristics of the migrating particle, the non-migrating particle being partially buried inside the fibrous structure; and
    a dividing wall comprising a photosensitive material.

* * * * *